C. W. MILLET.
CASTER WHEEL.
APPLICATION FILED MAY 22, 1915.
1,205,559.
Patented Nov. 21, 1916.
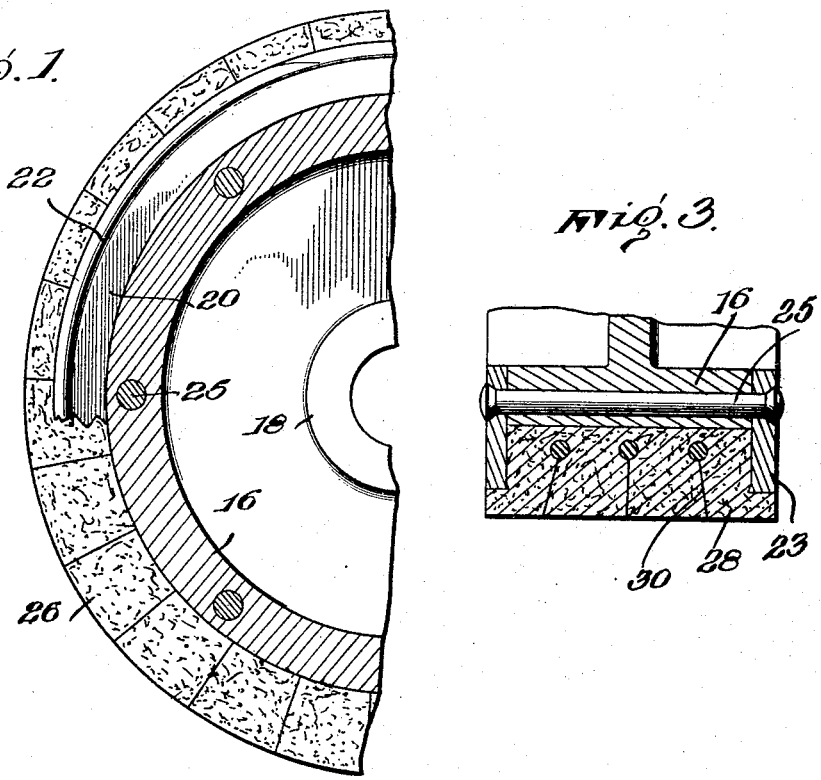
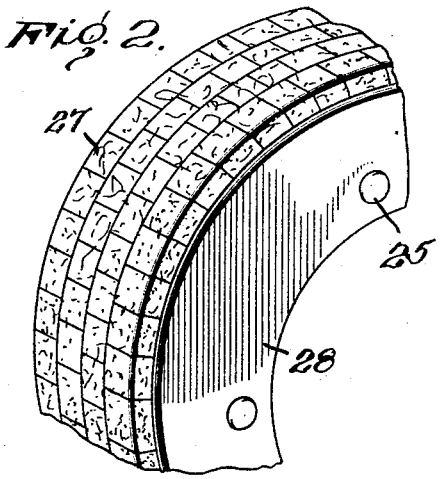
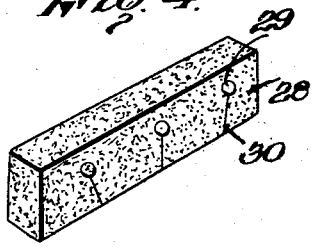
Inventor
C. W. Millet
By
[signature], Attorneys

UNITED STATES PATENT OFFICE.

CHARLES W. MILLET, OF NEW HARTFORD, NEW YORK.

CASTER-WHEEL.

1,205,559.  Specification of Letters Patent.  Patented Nov. 21, 1916.

Application filed May 22, 1915.  Serial No. 29,838.

*To all whom it may concern:*

Be it known that I, CHARLES W. MILLET, a citizen of the United States, residing at New Hartford, in the county of Oneida and State of New York, have invented certain new and useful Improvements in Caster-Wheels, of which the following is a specification.

This invention contemplates an improved wheel construction which may be embodied in a caster, truck wheel or the like, and has as its primary object to provide an efficient form of felt tread for the wheel.

The invention has as a further object to provide a construction wherein the tread will be formed from a single piece of material bent into desired annular shape and wherein when so molded, the fibers of the tread will be arranged radially of the wheel.

A still further object of the invention is to provide a construction wherein the tread of the wheel may be built up in layers from a plurality of segmental pieces of felt, thus making it possible to construct the wheel tread of any desired width and to also, at the same time, utilize felt scraps or what would otherwise be waste felt, in forming the said segmental pieces.

The invention has as a still further object to provide a construction wherein the tread of the wheel may be built up from a plurality of felt rings of the character previously referred to. And the invention has a still further object to provide a construction wherein locking rings will be employed for securely holding the felt tread upon the wheel and tending, in use, to minimize its tendency to buckle.

Other and incidental objects will appear as the description proceeds and in the drawings wherein I have illustrated the preferred embodiment of the invention and wherein similar reference characters designate corresponding parts throughout the several views.

Figure 1 is a fragmentary sectional view showing one form of the invention wherein a plurality of felt segments are employed and arranged in annular layers to build up the tread of the wheel, Fig. 2 is a fragmentary perspective view of the form of tread illustrated in Fig. 1, Fig. 3 is a fragmentary sectional view of a modified form of tread, and Fig. 4 is a detail perspective view of one of the felt strips employed in constructing the tread shown in Fig. 3.

In Figs. 1 and 2 of the drawings, a plurality of felt segments 26 are employed. These segments may be of any desired size and consequently, may be cut from scrap felt, or, from felt which would otherwise be regarded as waste. Care should be taken in cutting the segments that the fibers of the felt will run lengthwise of the said segments. The segments 26 are fitted around the hub 16 in the manner shown in Fig. 1 of the drawings to form a plurality of annular radially extending felt rings 27 extending radially from the hub. When thus arranged upon the hub, the ends of the fibers of the felt segments will be presented to the work and if desired, the segments of each felt ring may be glued together. Preferably, the segments 26 of one felt ring will be arranged in staggered relation to the segments of the next adjacent ring as shown in Fig. 2 of the drawings and interposed between adjacent felt rings, are locking rings 20 arranged to fit around the hub 16. After the tread has thus been built up around the hub, side plates 23 are applied and are secured in position by fastening devices 25. The locking rings 20 will tend to minimize the possibility of the buckling of the segmental felt rings so that the wheel in use, will prove entirely efficient.

In Fig. 3 of the drawings, I have shown a modified form of tread in connection with the hub 16. In this modification, I employ a plurality of felt strips 28 which are arranged side by side transversely of the hub 16, to form an annular tread. The strips 28, at longitudinally spaced points, are provided with a plurality of openings 29, preferably three in number, and communicating with the said openings, are slits 30 opening through the outer edges of the strips.

It will now be seen that when the strips are arranged upon the hub, the openings 29 thereof will aline to form annular channels. Disposed in said channels and surrounding the hub, are locking rings 12, the said rings being introduced through the slits 30. It will thus be seen that this construction provides a very efficient form of tread and wherein, if desired, scraps of felt may be employed in producing the strips 28. In this connection, it may be stated that the said strips may or may not be provided with slits 30 since, if found more desirable, the locking rings may simply be embedded within the strips.

Preferably, the locking rings employed in the practical manufacture of the invention will be of the character disclosed in the drawings, these rings to be constructed of wire and arranged between the rings 11 of the tread or through each ring, as may be desired, so as to bind them in such a manner as to prevent the said rings from buckling or working loose.

It will be understood that an important feature of the invention resides in the fact that the felt segments are so cut that the fibers will be presented end-wise at the periphery of the wheel which is a decided advantage over a structure in which the fibers are present lengthwise to the said surface as in the latter instance the tread of the wheel will in a short time become flat sided.

Having thus described my invention, what I claim and desire to secure by Letters Patent is:—

1. A device of the class described, including a hub, a plurality of fibrous strips arranged to extend transversely of the periphery of the hub in an annular series, the strips being provided with a plurality of slits extending inwardly from their outer edges, and rigid annular anchoring members seating in the inner ends of the slits and connecting the said strips throughout the series and holding the same in position upon the hub.

2. In a device of the class described, a hub, a plurality of fibrous strips disposed in an annular series about the hub and extending transversely of the periphery thereof, the said strips being arranged with the ends of the fibers presented at the outer surfaces of the strips, the said strips being provided with a plurality of slits extending inwardly from their outer edges, rigid annular anchoring rings disposed to surround the said strips and seating at the inner ends of the said slits and holding the strips against radial displacement, and side plates laterally binding the ends of the strips of the series whereby to close the outer ends of the said slits.

3. In a device of the class described, a hub, fibrous segments arranged in an annular series extending circumferentially of the hub, the individual segments of the series extending transversely of the periphery of the hub and being disposed with the ends of their fibers presented to constitute the working face of the device, and means securing the segments in place upon the hub.

In testimony whereof I affix my signature in presence of two witnesses.

CHARLES W. MILLET. [L. S.]

Witnesses:
BORDEN D. SMITH,
F. E. MOYER.

Copies of this patent may be obtained for five cents each, by addressing the "Commissioner of Patents, Washington, D. C."